United States Patent [19]
Sullivan

[11] 4,063,608
[45] Dec. 20, 1977

[54] HYDROSTATIC DRIVE VEHICLE

[76] Inventor: Patrick D. Sullivan, 3500 Granada St., No. 127, Santa Clara, Calif. 95051

[21] Appl. No.: 526,744

[22] Filed: Nov. 25, 1974

[51] Int. Cl.² .................................................. B60K 17/10
[52] U.S. Cl. ................................ 180/25 R; 180/66 R; 280/726
[58] Field of Search ............... 180/66 R, 66 F, 65 R, 180/25 R; 280/124 A, 277, 690, 701, 726

[56] References Cited
U.S. PATENT DOCUMENTS

| | | | |
|---|---|---|---|
| 2,141,215 | 12/1938 | Leighton | 280/124 A |
| 2,240,011 | 5/1941 | Casey | 180/66 R |
| 2,598,538 | 5/1952 | Haynes | 180/66 R |
| 2,678,106 | 5/1954 | Vonderheide | 180/66 R |
| 2,807,935 | 10/1957 | Lapsley | 180/66 R |
| 2,833,362 | 5/1958 | Martin | 180/66 R |
| 2,887,960 | 5/1959 | Tobias | 180/66 R |
| 2,942,677 | 6/1960 | Gray | 180/66 R |
| 2,966,951 | 1/1961 | Lang | 180/25 R |
| 3,177,963 | 4/1965 | Mitchell | 280/277 |
| 3,193,040 | 7/1965 | Loomis | 180/66 R |
| 3,219,137 | 11/1965 | Appleton | 180/65 R |
| 3,369,360 | 2/1968 | De Biasi | 180/66 R |
| 3,424,260 | 1/1969 | Stone et al. | 180/66 R |
| 3,493,067 | 2/1970 | Rumsey | 180/66 F |
| 3,563,012 | 2/1971 | Strasel | 180/66 R |
| 3,826,326 | 7/1974 | Blair | 180/25 R |
| 3,831,967 | 8/1974 | Uhlenhaut | 280/124 A |
| 3,912,033 | 10/1975 | Ancel | 180/66 R |

Primary Examiner—Joseph F. Peters, Jr.
Assistant Examiner—David M. Mitchell
Attorney, Agent, or Firm—John J. Leavitt

[57] ABSTRACT

Presented is a vehicle equipped for locomotion through the use of hydraulic motors associated with the driving wheels. The vehicle is equipped with a hydrostatic transmission system that operates at low or high speeds, and which provides high torque for pulling heavy loads and a by-pass for free wheeling.

2 Claims, 11 Drawing Figures

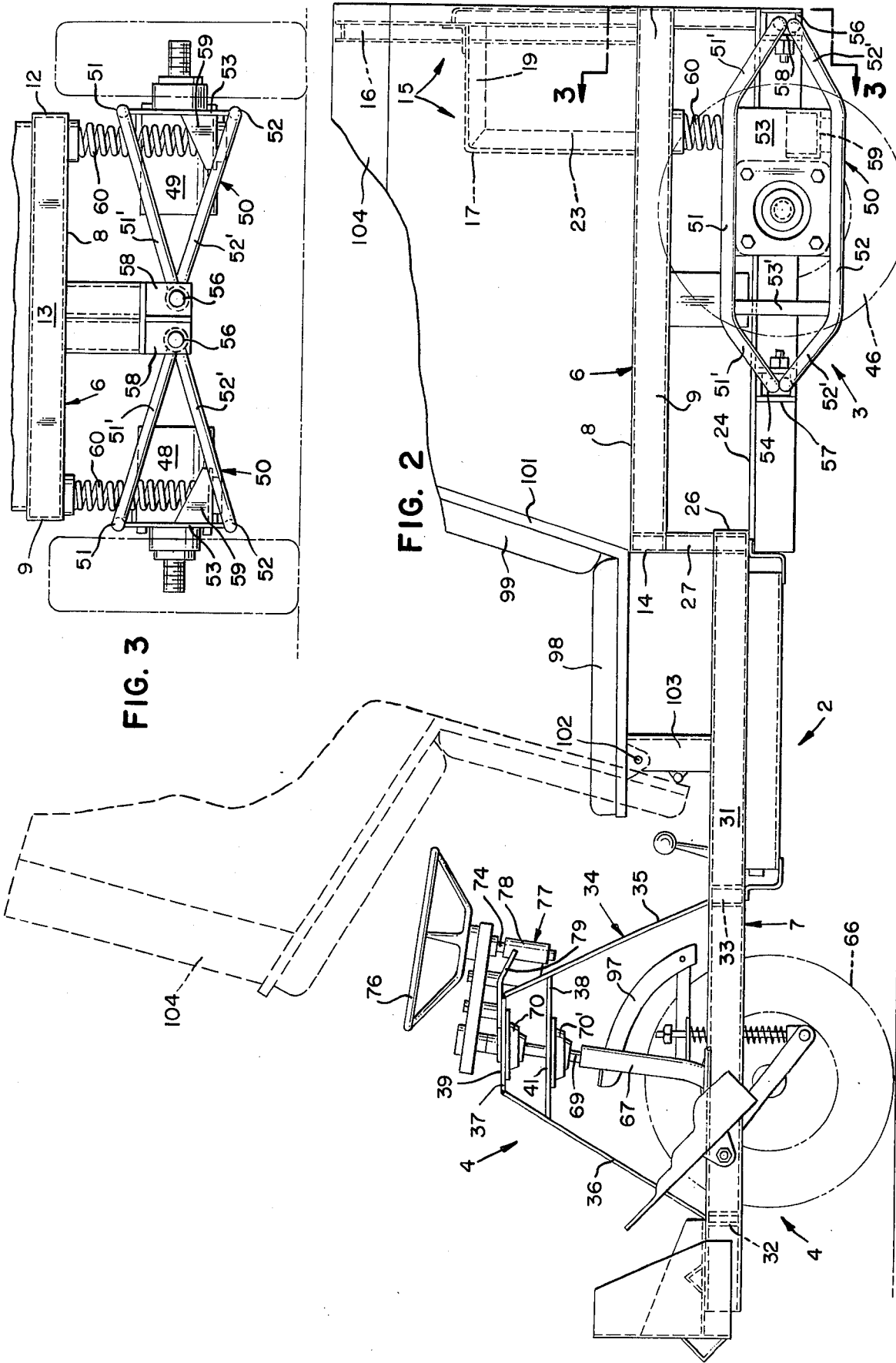

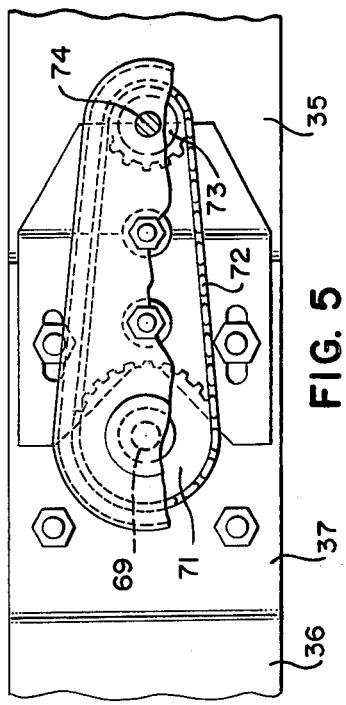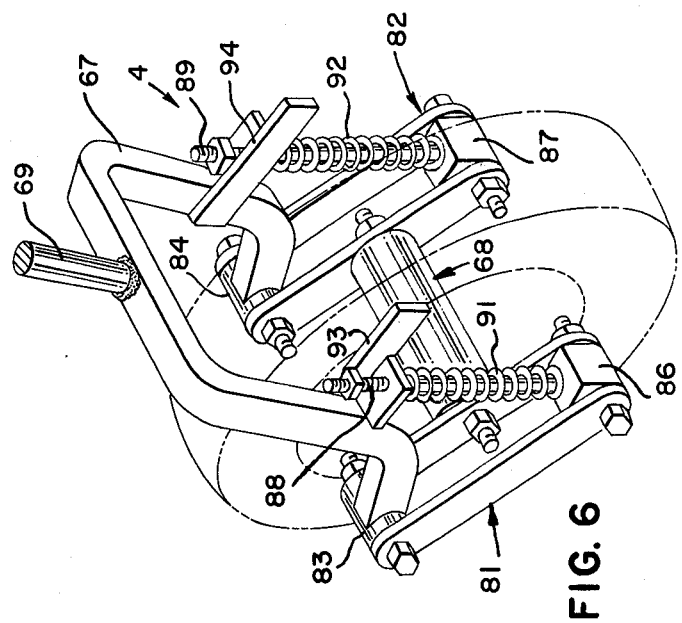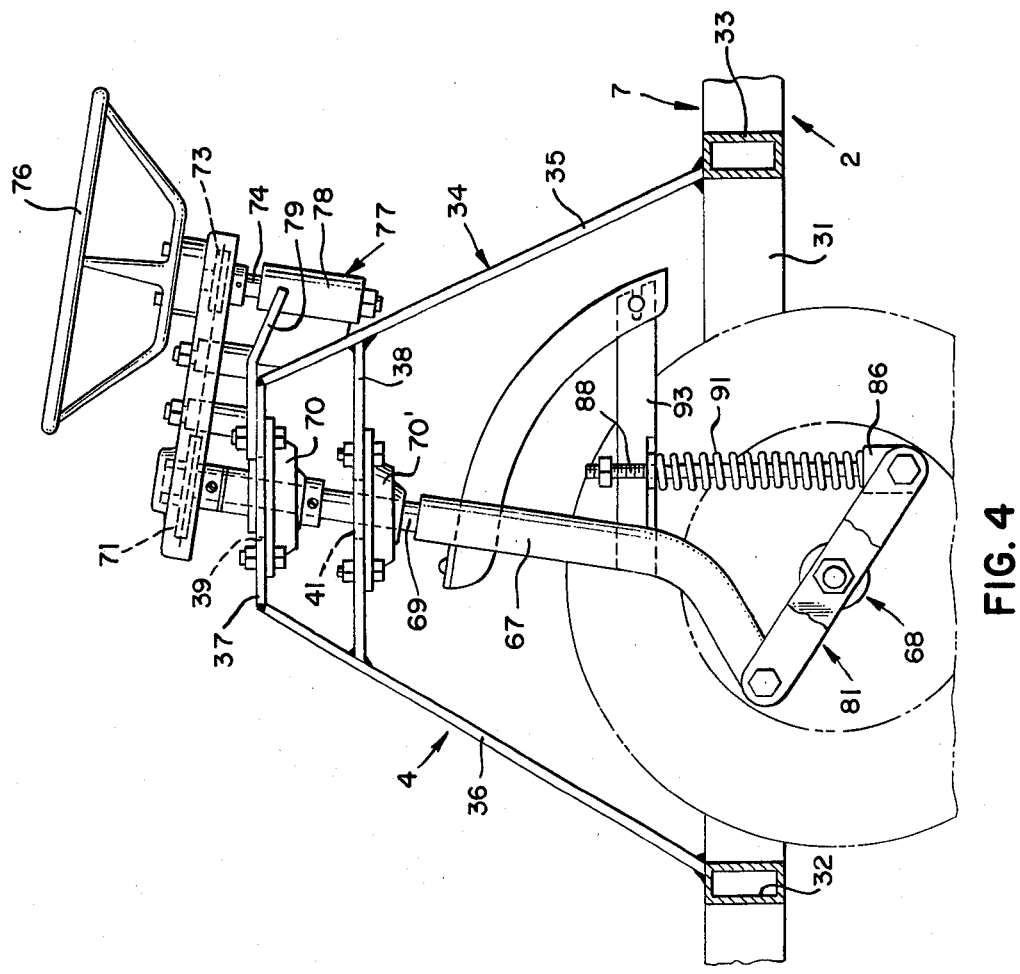

HYDROSTATIC DRIVE VEHICLE

BACKGROUND OF THE INVENTION

There are many environments in which a utility vehicle is required in which conventional automobiles or trucks are not suitable. For instance, working in and around railroad cars and railroad engines, the terrain is uneven, frequently there are no roads, other vehicles such as trailers must frequently be towed, and control of the utility vehicle must be entrusted to persons who are not always experts in handling more sophisticated type vehicles of conventional design. Accordingly, one of the objects of the present invention is to provide a utility vehicle that utilizes a hydrostatic drive system for providing driving power.

The frequency of use, or the demand placed on a utility vehicle, sometimes controls the feasibility of purchase of a utility vehicle. Where the use of a utility vehicle is infrequent, it is of course not economical to purchase an expensive conventional tractor or truck. Accordingly, it is another object of the invention to provide a utility vehicle having a hydrostatic drive system for providing motive power, which is low in initial cost, simple to maintain, and simple to operate, so that even inexperienced personnel may operate the vehicle.

One of the disadvantages of more conventional trucks and automobiles for use as specialized utility vehicles is that they tend to be sophisticated. Many different gauges and dials are used and these must be monitored by the operator. The transmissions incorporated in these vehicles frequently utilize multiple gears such as four forward speeds and one reverse, the effective operation of which requires considerable talent on the part of the operator. These vehicles tend to be large and cumbersome in addition to being mechanically complicated and difficult to operate by inexperienced personnel. Accordingly, a still further object of the invention is the provision of a utility vehicle that utilizes a hydrostatic drive system which is controlled simply by the depression of a single pedal and manipulation of a single valve lever.

Utility vehicles of conventional design are frequently overly large, restricting the spaces into which such vehicles may be driven. For instance, in a railroad yard where multiple tracks are used for storage of railroad cars, it is frequently necessary for a vehicle to drive between the cars to effect servicing of the cars stored on adjacent tracks. Conventional vehicles, because of their size, generally cannot be used in such an environment. Accordingly, a still further object of the invention is the provision of a hydrostatically driven utility vehicle of small and compact size that may easily be driven into areas that are inaccessible to a conventional utility vehicle.

Conventional utility vehicles almost universally utilize four wheels and a conventional steering system for the front or rear wheels of the vehicle. Such a steering system restricts the mobility and maneuverability of the utility vehicle. Accordingly, it is a further object of the invention to provide a hydrostatically driven utility vehicle that is provided with only three wheels, the steering system incorporating only a single wheel.

The invention possesses other objects and features of advantage, some of which, with the foregoing, will be apparent from the following description and the drawings. It is to be understood however that the invention is not limited to the embodiment illustrated and described as it may be embodied in various forms within the scope of the appended claims.

SUMMARY OF THE INVENTION

In terms of broad inclusion, the hydrostatically driven utility vehicle of the invention comprises a steel frame having a pair of traction wheels associated with one end of the frame and a single steering wheel associated with the opposite end of the frame. Supported on the frame is a gasoline driven engine appropriately connected to a hydraulic pump. Storage means for hydraulic fluid are maintained on the vehicle, and appropriate high hydraulic pressure lines connect these storage reservoir to the hydraulic pump. An internal combustion engine is utilized to drive the pump to pressurize the hydraulic fluid and pump it through appropriate hydraulic motors associated with each of the traction wheels. Valve means are provided manipulable to effect forward or reverse movement of the vehicle, and means are also provided for increasing the velocity of the hydraulic fluids between the hydraulic pump and the individual wheel motors to effect control of the speed function of the machine.

DESCRIPTION OF THE DRAWINGS

FIG. 2 is a side elevational view illustrating the vehicle chassis and the front and rear running gear.

FIG. 3 is a rear elevational view taken in the direction of the arrows 3—3 in FIG. 2.

FIG. 4 is an enlarged fragmentary side elevational view of the front wheel assembly.

FIG. 5 is an enlarged fragmentary view in plan showing a portion of the steering mechanism.

FIG. 6 is a fragmentary perspective illustrating the front suspension means.

DESCRIPTION OF PREFERRED EMBODIMENT

In terms of greater detail, the hydrostatically driven vehicle of the invention will be described in terms of its mechanical, hydraulic and electrical assemblies, each of the assemblies being described in detail, followed by a summary that explains and describes the cooperative interrelationship between the assemblies.

MECHANICAL ASSEMBLY

Figure 9:
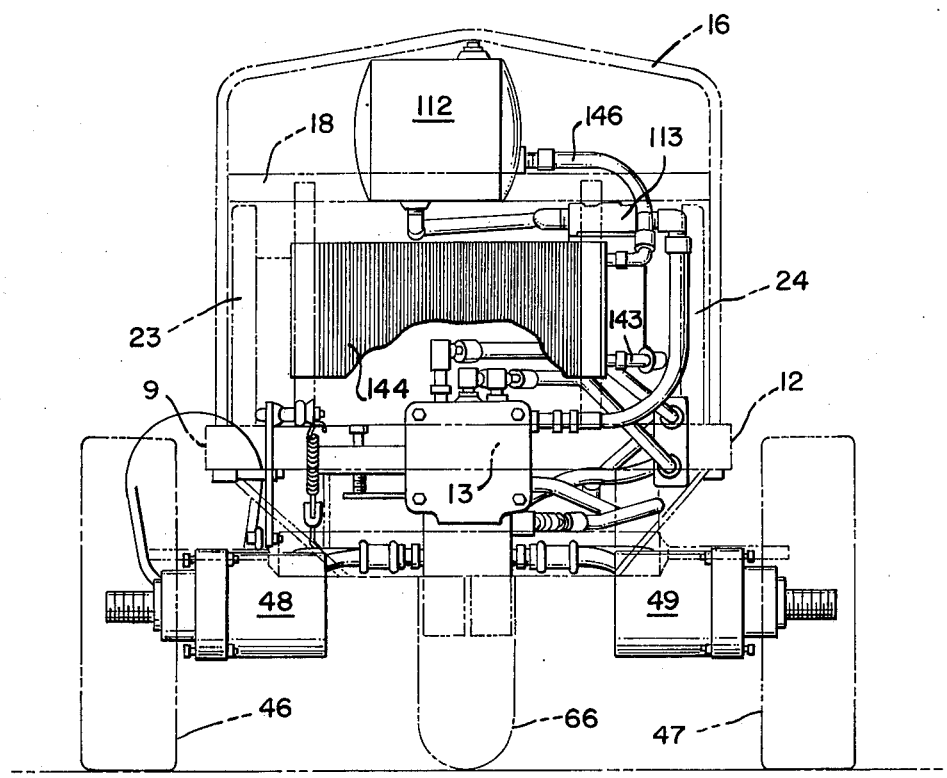
FIG. 9 is a rear elevational view of the hydrostatic system, again shown in position of use on a vehicle chassis, which is shown in broken lines.
Figure 1:
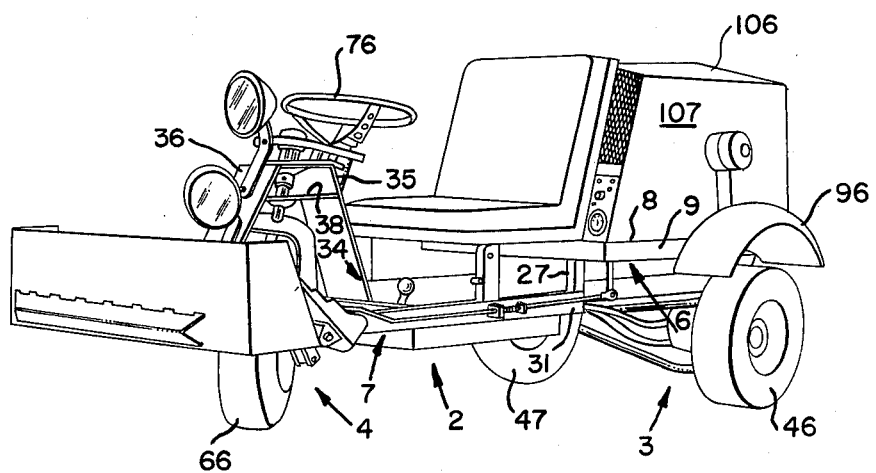
FIG. 1 is a perspective view illustrating the hydrostatic drive vehicle of the invention.
Figure 7:
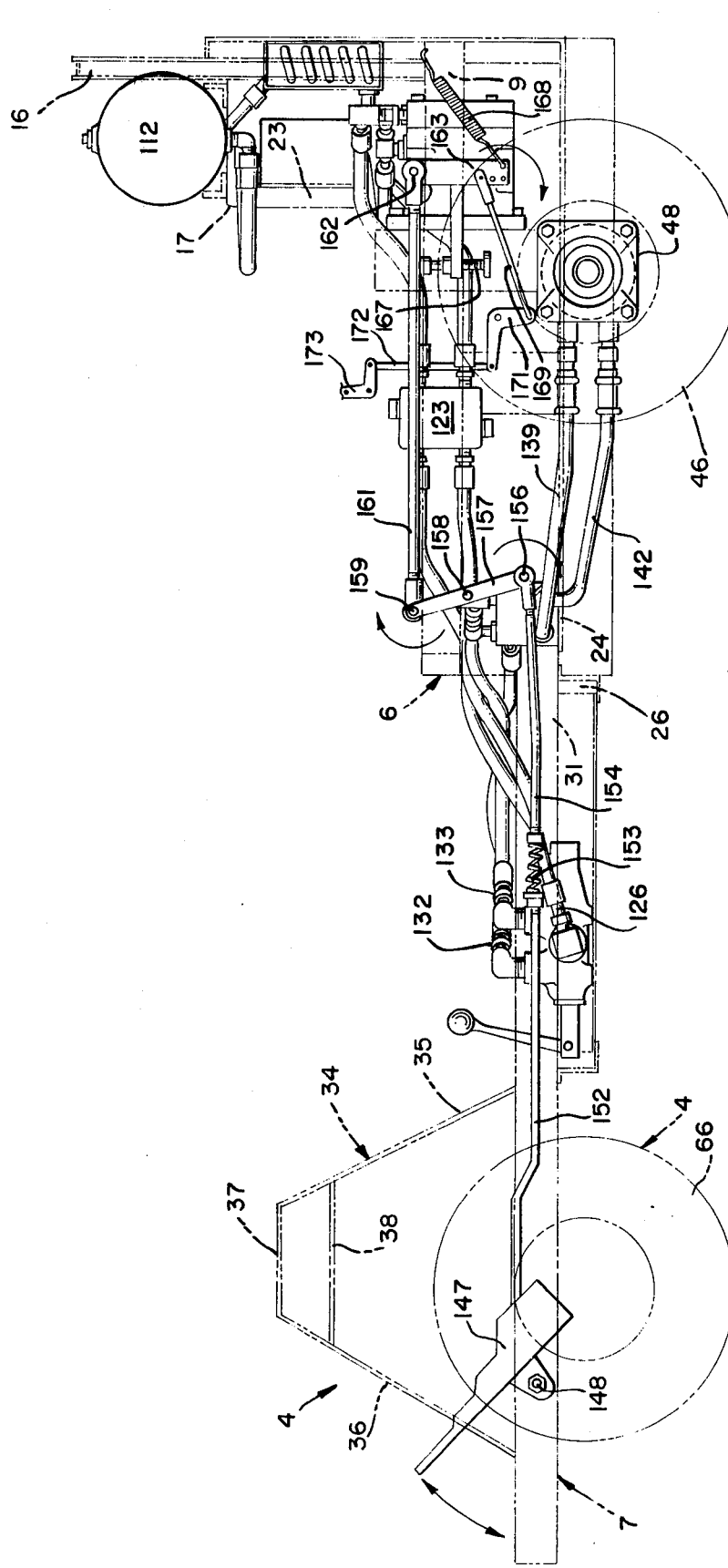
FIG. 7 is a side elevational view of the hydrostatic system shown in mounted position on the chassis, which is shown in broken lines.

The hydrostatically driven utility vehicle of the invention comprises a chassis designated generally by the numeral 2 and illustrated in FIGS. 1–6. The chassis is provided with running gear in the form of a rear suspension designated generally by the numeral 3, and a front suspension and steering assembly designated generally by the numeral 4. As illustrated in FIGS. 1–3, the chassis includes a rear section designated generally by the numeral 6 and a front section designated generally by the numeral 7. The rear section 7 of the chassis is preferably formed by a generally rectangular metal frame 8, including longitudinal members 9 and 12, a rear cross member 13 and a forward cross member 14. An auxiliary frame designated generally by the numeral 15 is mounted on the rear section 6 of the chassis adjacent the rear cross member 13. The auxiliary frame includes an upwardly extending U-shaped roll-bar 16, opposite ends of which are welded to the chassis at the intersection of the longitudinal members 9 and 12 with the rear cross member 13. The auxiliary frame also includes front and rear cross pieces 17 and 18 respectively, joined at opposite ends by longitudinally extending stringers 19 and 21. The ends of the forward cross piece 17 are attached by vertical posts 22 and 23 with the main chassis members 9 and 12. The frame work thus formed forms a support for elements of the hydraulic system which will hereinafter be explained in greater detail.

Figure 8:
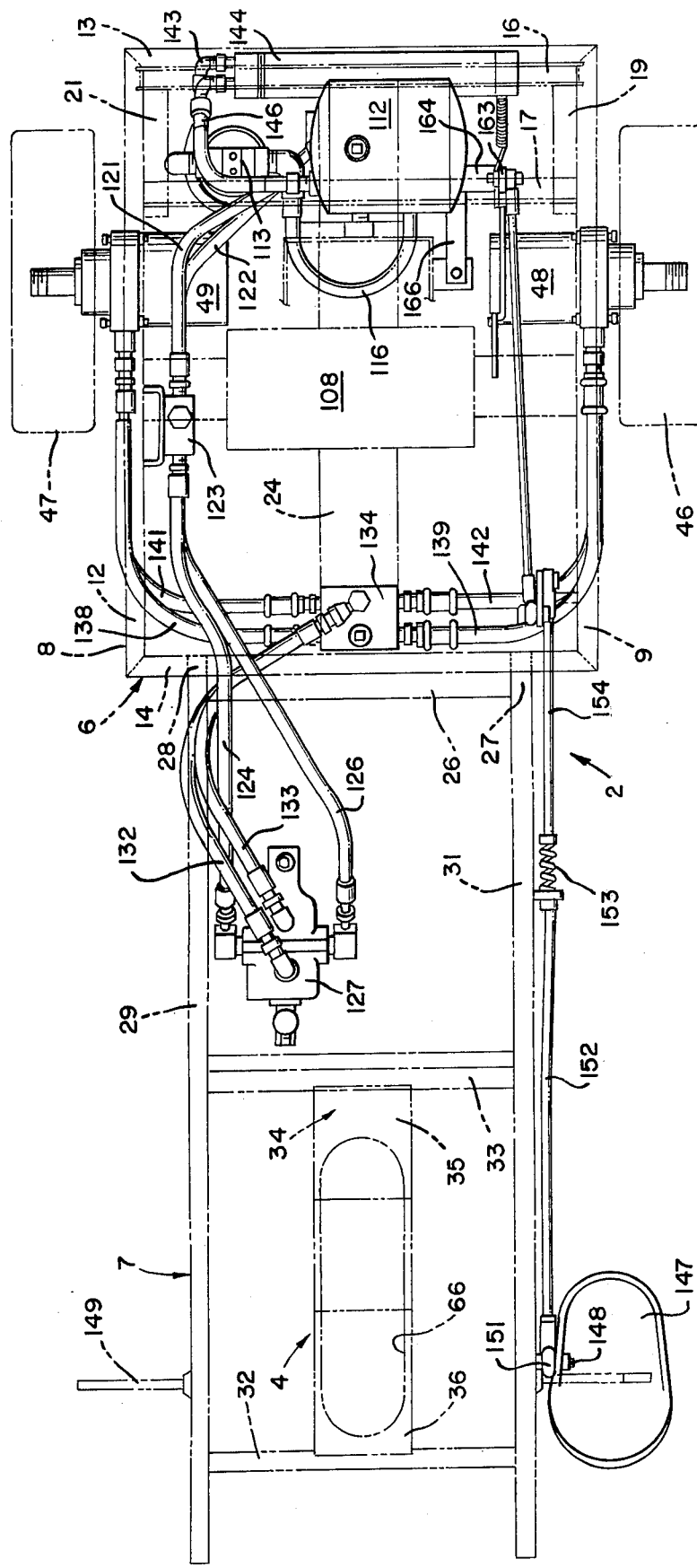
FIG. 8 is a plan view of the hydrostatic system shown in relation to the chassis, which is shown in broken lines.

Also forming a part of the rear section 6 of the chassis is a motor mounting structure illustrated in FIGS. 1 and 8, and comprising a longitudinally extending stringer 24, conveniently a T-bar, one end of which is attached to the rear cross member 13, while the forward end is attached to the rear cross member 26 of the forward chassis section 7. The cross member 26 of the forward chassis section is vertically displaced from the forward end of the rear section 6 of the chassis by suitable vertically depending posts 27 and 28.

Opposite ends of the cross member 26 are connected by longitudinally extending stringers 29 and 31 forming a part of forward section 7 as shown. The forward ends of the longitudinal frame members 29 and 31 are connected by a forward cross member 32. Intermediate the rear cross member 26 and forward cross member 32 of the front section 7 of the chassis there is disposed a third cross member 33. Mounted between the intermediate cross member 33 and forward cross member 32 is an upwardly extending steering assembly bracket designated generally by the numeral 34, and including an upwardly extending rear leg 35 and an upwardly extending front leg 36. The upper ends of the legs are joined integrally by a plate 37 while a second plate 38 is appropriately interposed between intermediate sections of the upwardly extending legs 35 and 36 to provide the requisite rigidity to the structure. Apertures 39 and 41 are formed in the plates 37 and 38, respectively, for purposes which will hereinafter be explained in greater detail.

It will thus be seen that the chassis is both rigid and specially designed to receive the rear suspension 3 and steering assembly 4. As will hereinafter be apparent, the chassis accommodates other elements so as to make it possible for one man to operate the vehicle simply by depressing one foot pedal and operating a single hand lever. Thus, persons unable to drive a more sophisticated conventional automotive type vehicle can easily manipulate the controls of the hydrostatically driven utility vehicle forming the subject matter of this invention.

It is one of the peculiarities of a hydrostatically driven vehicle that each of the wheels 46 and 47 journaled on the rear suspension 3 be independently driven by hydraulic motors 48 and 49, respectively. For this reason, the rear suspension for the utility vehicle must be designed in such a manner that each wheel is independently suspended together with the hydraulic motor which provides torque to that wheel. Accordingly, referring to FIGS. 2 and 3, it is there shown that the suspension for each rear wheel 46 and 47 comprises a frame designated generally by the numeral 50, and having longitudinally extending bars 51 and 52 joined intermediate their ends by a gusset plate 53 and a post 53'. Opposite end portions 51' and 52' of each bar are bent at an angle of about 30° to the associated bar 51 or 52, and opposed corresponding end portions converge toward bearing assemblies 54 and 56 at each opposite end as shown.

The bearing assemblies 54 and 56 are appropriately journaled on brackets 57 and 58 suitably secured as by welding to the web of longitudinal T-bar 24 of the chassis. Interposed between the chassis and a support bracket 59 welded to the inner surface of each of the gusset plates 53, is a compression spring 60 disposed to resiliently support the weight of the vehicle between the chassis and the rear suspension. A through-bolt 61 extending through the bracket 59, spring 60 and associated stringers 9 and 12 limit pivotal movement of the rear suspension about bearing brackets 54 and 56. Thus, each of the rear wheels of the utility vehicle is independently associated with its own motive power in the form of a hydraulic motor, the motor in each instance being detachably secured to the gusset plate 53 by appropriate bolts. Inasmuch as the rear suspension assembly just described is identical for each wheel, corresponding reference numbers are applied to the rear suspension assembly associated with wheel 46.

Referring to FIGS. 1-6, the front suspension and steering assembly 4 is mounted in conjunction with the framework 34-39, and comprises a single front wheel 66 appropriately journaled in a pivotal fork structure 67 by an axle assembly 68. The fork is appropriately provided with an upwardly extending stub shaft 69 which projects through the apertures 39 and 41 in the steering assembly bracket, and the stub shaft is appropriately secured in said apertures and journaled in relation to the bracket by appropriate bearing assemblies 70 and 70' detachably secured to the top plate 37 and intermediate plate 38 respectively.

The upper end portion of the stub shaft is provided with a sprocket 71 connected by an appropriate chain 72 to a drive sprocket 73 keyed to a steering shaft 74 having a steering wheel 76 mounted on the upper end thereof. The sprocket 71 is appropriately keyed to the stub shaft 69 which forms an extension on the fork 67, so that rotation of the sprocket 71 effects pivotal rotation of the fork. The steering shaft 74 is appropriately journaled in a steering mount designated generally by the numeral 77, and includes a cylindrical sleeve 78 and a mounting plate 79 welded thereto and appropriately secured to the top plate 37 and rear leg 35 of the steering bracket. The drive sprocket 73 is appropriately keyed to the steering shaft 74 so that rotation of the steering wheel 76 effects rotation of chain 72 and consequently, effects rotation of sprocket 71 and the fork and wheel 66 associated therewith. It will thus be seen that steering of the hydrostatically driven utility vehicle is directly coupled to the steering wheel so that even a minute rotation of the steering wheel is immediately transmitted to the single front wheel with an appropriate response by the vehicle. It has been found that by virtue of this three point suspension, the utility vehicle is capable of accommodating itself to almost any terrain. Additionally, because of its low center of gravity, the vehicle is especially stable even on terrains having a high slope factor. Because of the independent suspension of each of the rear wheels which, as indicated above, is independently driven by its own hydraulic motor, the utility vehicle is especially adapted to provide traction to negotiate rough and uneven terrain.

Because the rough environment in which the utility vehicle is used is apt to cause jarring impacts to the frame, the front wheel assembly including wheel 66 and axle assembly 68 is appropriately mounted on a resiliently loaded rocker assembly including pairs of rocker arms 81 and 82, appropriately journaled respectively on the lower bearing ends 83 and 84 of the forks. Their opposite ends are pivotally connected to bearing blocks 86 and 87 mounted on the lower end of vertical rod support members 88 and 89 as shown. Coil compression springs 91 and 92 are provided disposed about the vertical rod members 88 and 89, and work against appropriate cantilever brackets 93 and 94 projecting from the fork structure to absorb impact shocks transmitted by the wheel 66.

It will thus be seen that both at the rear end of the chassis 2 and the forward end of the chassis the vehicle is resiliently suspended so that the rough terrain or environment in which it is adapted to work will not impose destructive impacts on the equipment mounted on the utility vehicle chassis. In this regard, and referring to FIGS. 1, 2 and 4, it will be seen that the utility vehicle is also provided with rear fenders 96 and a front fender 97. Also mounted on the frame is a seat cushion 98 associated with a back cushion 99 to give support to the operator, both of the frames being supported within a framework 101 pivotally supported as at 102 on a pair of upright brackets 103. As indicated in FIG. 2, the seat structure, including the cushions form the forward end of an engine cover 104, the forward end of which is attached to the seat frame 101. The engine cover 104 is generally rectangular in configuration and is provided with a top 106 and side walls 107 as shown in FIG. 1. The engine cover extends down over the power plant which is supported in the rear frame section 6, specifically, superimposed on the beam 24 and a motor mounting plate 108 shown in broken lines in FIG. 8. The advantage of this construction is that the entire engine cover and seat assembly may be pivoted forward to give unrestricted accesss to the engine. For purposes of clarity in the illustration and in this description, the engine is not illustrated. It has been found that a single cylinder, 14 h.p. 4 cycle air-cooled engine offers sufficient power with a smoothness and simplicity to provide maximum performance characteristics for the utility vehicle. Obiviously, engines of greater or lesser horsepower may be used if desired.

HYDROSTATIC SYSTEM

As indicated above, the engine just discussed is utilized to activate the hydrostatic split transmission system to provide positive hydraulic drive for the utility vehicle. The use of this type hydraulic drive eliminates chains, sprockets belts, clutches, transmissions and axles, resulting in safer and more economical operation of the utility vehicle with minimum service problems. Additionally, the split transmission system is designed to provide operational characteristics that are not available in other types of drive systems. For instance, the hydrostatic system illustrated provides very low speed operation if this is what is desired, coupled with extremely high torque of the driving wheels. Additionally, where it is necessary to freewheel the vehicle, the system provides a by-pass to make this possible. Another advantage of this type hydraulic drive system is that acceleration and deceleration is effected with a single foot pedal control.

Figure 10:
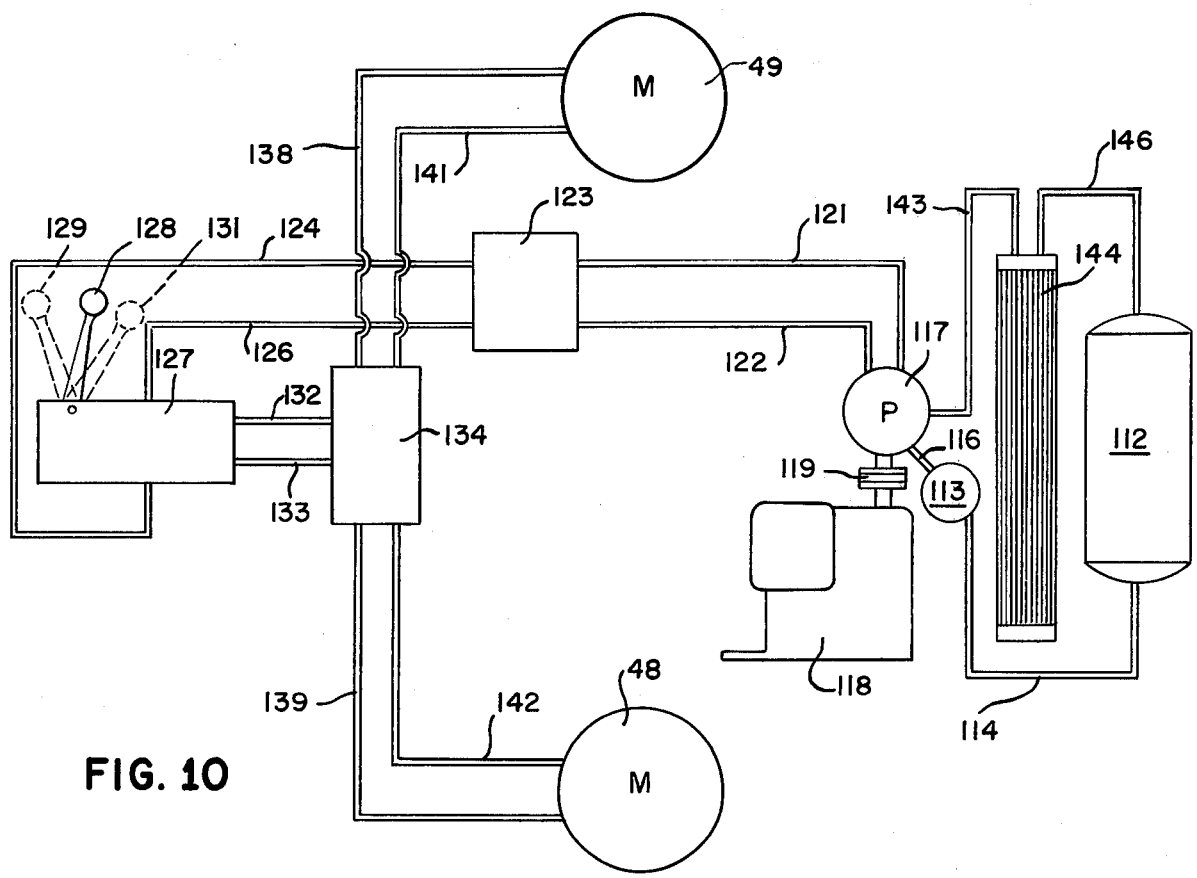
FIG. 10 is a schematic illustration of the hydraulic circuit for the hydrostatically driven vehicle.

Referring specifically to FIGS. 7 through 10, inclusive, it will there be seen that the hydrostatic system of the invention includes a reservoir 12 which supplies the charging circuit with oil for cooling in the closed hydraulic system. The system also includes a filter 113 which may converiently be of 10 micron size, and which functions to preclude contaminated oil from getting into the hydraulic system. As illustrated in FIG. 10, an appropriate conduit 114 connects the reservoir to the oil filter, the oil filter in turn being connected by a conduit 116 with a pump 117. The hydraulic pump may conveniently be a Sundstrand Model No. 15-2008CW, while the filter may conveniently be type FA101 manufactured by Gresen Mfg. Company.

To drive the pump, as previously discussed, there is provided a 14 H.P. air-cooled engine 118 connected to the pump through a flexible coupling 119. The pump is connected by appropriate conduits 121 and 122 to a cushion valve 123 which may be type DLV-50E manufactured by Gresen Mfg. Company, the valve functioning to eliminate or minimize shock, surge, and overload conditions on the hydraulic equipment. The cushion valve also functions to relieve the pressure in the system by re-directing oil into the opposite side of the cushion valve, thereby preventing cylinder or motor cavitation and thus eliminating the need of an anti-cavitation check. From the cushion valve 123, hydraulic fluid under pressure is directed through the high pressure conduits 124 or 126, it being understood that when one of the conduits 121-124 or 122-126 is being used as the high pressure line, the opposite conduit constitutes the return line to the pump.

Both conduits 124 and 126 terminate at a control valve 127 which may be Gresen type 410-40 provided with a single lever control 128. This control valve is provided with three detent positions, the control lever remaining in any selected position. For instance, when the control lever is moved into the broken line position 129 illustrated in FIG. 10, the control valve is opened so as to permit forward movement of the vehicle. On the other hand, when the valve lever is in the neutral position as illustrated in full lines, the control valve operates as a by-pass to permit freewheeling of the vehicle. On the other hand, to effect reverse movement of the utility vehicle, the control lever is moved into the rear position illustrated at 131.

From the control valve 127, fluid under pressure is channeled through appropriate conduits 132 and 133 to a manifold 134 which performs the function of dividing the pressurized hydraulic fluid so as to direct it in one direction or the other to the wheel motors 136 and 137. Thus, to effect forward movement of the vehicle, fluid under pressure may be channeled through high pressure conduits 138 and 139 to each of the motors 136 and 137, with conduits 141 and 142 constituting return conduits to return the fluid through the control valve, the cushion valve, the pump, and through an appropriate conduit 143 to the input port of a heat exchanger 144. The output from the heat exchanger is channeled through a conduit 146 back to the reservoir 112.

From the above it will be seen that once the engine 118 is started, the pump 117 is also actuated and immediately causes the hydraulic fluid to flow through the high pressure hydraulic lines 121-124 and 122-126, both connected between the pump and the control valve 127 through the cushion valve 123. If the control lever 128 is in the full line position illustrated in FIG. 10, it will of course be obvious that the high pressure fluid merely circulates between the pump and the control valve without being shunted to the motors. To activate the vehicle, and cause forward motion thereof, the control lever 128 is pushed forwardly into the position illustrated in 129 and this causes high pressure fluid to be transferred to the manifold 134 from which it is split and channeled through conduits 141 and 142 to motors 48 and 49 to drive the vehicle forward.

Acceleration and deceleration of the vehicle is accomplished through a foot control 147 in the nature of an accelerator pedal, the pedal being pivotally mounted on an appropriate pivot 148 on the forward portion of the frame 7. The opposite foot is merely supported on a suitable pin 149 as illustrated in FIG. 8. If desired, a pedal similar to the pedal 147 may be mounted on the pin 149 to provide a more secure foot rest for the operator. The pedal 147 is connected by an appropriate crank arm 151 with a rod 152 having a spring 153 interposed therein to absorb shocks and vibration, and having a rod extension 154 continuing generally parallel to the longitudinal stringer 31 of the frame portion 7. The accelerator rod is pivoted at its end 156 to a crank arm 157, which is in turn pivoted at about its midpoint 158 to an appropriate pivot pin, while its opposite end 159 is also pivoted to an accelerator control rod 161 which continues rearwardly to terminate at a pivot point 162 formed on the upper end of a plate 163 welded to the end of a rotatable shaft 164.

The shaft has welded to one peripheral surface thereof a forwardly projecting lever arm 166 having a fine-adjustment thumb screw 167 on the end thereof to control the extent of pivotal movement of the plate 166. The end of plate 163 opposite pivot point 162 is provided with a coil spring 168, one end of which is attached to the extreme end of plate 163 and the other end of which is appropriately connected to an associated part of the frame as shown. The bias of spring 168 is such as to impose a counter-clockwise rotational moment on the plate 163 and the associated forwardly projecting plate 166, tending to cause counter-clockwise rotation of the plate 166 about the axis of rotation of the bell crank plate 163. Also connected to the lower end of the bell crank plate 163 is a lever 169 the opposite end of which is connected to a bell crank 171 suitably pivoted on the motor (not shown) and operable through additional length 172 to operate a bell crank 173 connected at the carburetor of the engine 118.

It will thus be seen that close control of the forward or reverse speed of the vehicle is controlled solely through the actuation of the foot pedal 147. By depressing the foot pedal 147, the bell crank 157 is caused to rotate clockwise, thus pushing the rod 161 rearwardly, and causing the bell crank plate 163 to rotate clockwise in opposition to pull of spring 168. This causes rotation of the shaft 164 under controlled conditions as imposed by the adjustment screw 167 on plate 166, thus controlling the velocity of fluid through the pump and the consequent forward or reverse speed of the vehicle. In this regard, it is important to note that actuation of the wheel motors 48 and 49 is positive in effect, i.e., because of the high torque that is applied to the wheels, it doesn't matter whether the vehicle is going uphill or downhill, the forward or reverse velocity of the vehicle in relation to the ground will remain constant unless controlled by movement of the control pedal 147. With respect to the driving motors 48 and 49 at each of the wheels, it has been found that suitable torque may be secured through use of type MAB-08 torque motors manufactured by Rucker Products, Inc. It has been found that this torque motor produces approximately 1100 pounds of theoretical torque, running with a volume of approximately 10 gallons of oil per minute of hydraulic fluid pressurized to 1500 pounds per square inch and running at 320 rpm.

ELECTRICAL SYSTEM

Figure 11:
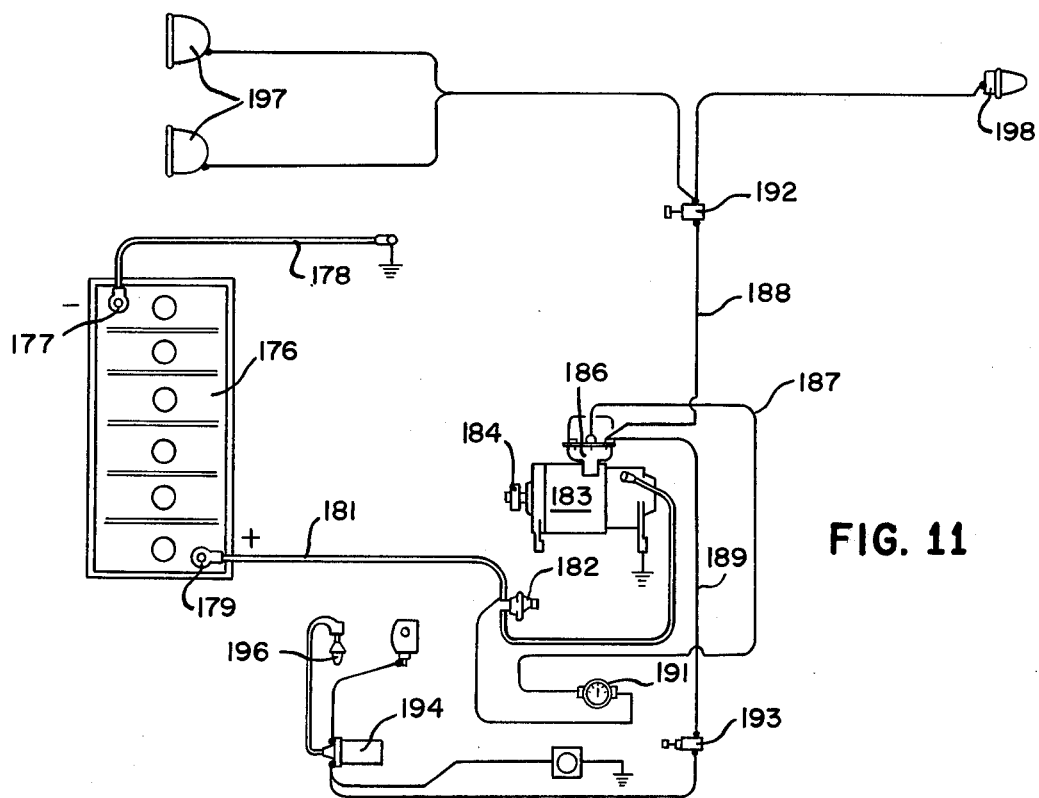
FIG. 11 is a schematic illustration of the electrical circuit for the hydrostatically driven vehicle.

The vehicle illustrated is equipped with a 12 volt electrical system the prime component of which is the battery 176, the negative terminal 177 of which is connected to ground as shown through an appropriate cable 178. The positive terminal 179 of the battery is connected through a cable 181; to a starter switch 182 which is in turn connected with a starter motor 183. A starter motor is provided with a pinion 184 suitably engaged with a ring gear on the engine (not shown). A voltage regulator 186 is provided connected through appropriate leads 187, 188 and 189 with ammeter 191, a light switch 192 and an ignition switch 193 which is conventionally connected through a coil 194 to a spark plug 196. As illustrated in FIG. 11, the light switch 192 controls headlights 197 and taillight 198.

It will thus be seen that even in the electrical circuitry, the utility vehicle of the invention has been simplified so that even inexperienced personnel may troubleshoot the electrical system to determine the cause of any malfunction. The same concept of simplicity has been carried through the hydrostatic system and for the same reason. It thus appears that the utility vehicle of the invention is not only rigid in the sense that it is strong enough to withstand the rough treatment which it is bound to receive because of the environment in which it will operate, but is constructed so simply as to eliminate many operational problems that might otherwise be present in a more sophisticated and complicated device.

Having thus described the invention, what is claimed to be novel and sought to be covered by letters patent of the United States is as follows:

1. A hydrostatic drive vehicle comprising:
   a. a rigid frame having a front and a rear section disposed end-to-end to form an elongated chassis;
   b. a single front wheel assembly pivotally mounted on the front section of the frame and including a front fork on which a front wheel is journaled and a steering wheel for pivoting the fork;
   c. a pair of rear wheels each independently suspended on the rear section of said frame and cooperating with said front wheel to provide a three point independent suspension for the vehicle;
   d. a hydraulic motor connected directly to each of said rear wheels and adapted to selectively drive said wheels in either a forward or reverse direction;
   e. hydraulic circuit means including said hydraulic motors, a pump for pressurizing said circuit, and drive means for the pump;
   f. means for selectively controlling the flow of hydraulic fluid through said circuit to bypass said motors or to effect rotation of said motors in either a forward or reverse direction; and
   g. independent suspension means for each rear wheel, the suspension means for each wheel comprising a frame having longitudinally extending bars opposite end portions of which are bent at an angle of about 30°, opposed corresponding end portions of said bars converging toward each other, a bearing assembly on said rear frame section pivotally receiving said converging end portions, a mounting plate fixed on said suspension frame to receive said hydraulic motor associated with each wheel, and spring means disposed between said suspension frame and said rear frame section to absorb impact shocks imposed on said rear wheels.

2. A hydrostatic drive vehicle comprising:

a. a rigid frame having a front and a rear section disposed end-to-end to form an elongated chassis;

b. a single front wheel assembly pivotally mounted on the front section of the frame and including a front fork on which a front wheel is journaled and a steering wheel for pivoting the fork;

c. a pair of rear wheels each independently suspended on the rear section of said frame and cooperating with said front wheel to provide a three point independent suspension for the vehicle;

d. a hydraulic motor connected directly to each of said rear wheels and adapted to selectively drive said wheels in either a forward or reverse direction;

e. hydraulic circuit means including said hydraulic motors, a pump for pressurizing said circuit, and drive means for the pump;

f. means for selectively controlling the flow of hydraulic fluid through said circuit to bypass said motors or to effect rotation of said motors in either a forward or reverse direction; and g. said front frame section being depressed below the rear frame section, a T-bar centrally disposed below said rear frame section at about the level of said depressed front section, a pair of wheel suspension frames pivotally connected to said T-bar on opposite sides thereof, and spring means interposed between each said wheel suspension frame and the associated rear frame section to absorb impact shocks imposed on said rear wheels.

* * * * *